(12) United States Patent
Nago et al.

(10) Patent No.: US 6,596,137 B2
(45) Date of Patent: Jul. 22, 2003

(54) BIPOLAR MEMBRANE

(75) Inventors: Satoshi Nago, Tokuyama (JP); Fumio Hanada, Tokuyama (JP)

(73) Assignee: Tokoyama Corporation, Yamaguchi (JP)

( * ) Notice: Subject to any disclaimer, the term of this patent is extended or adjusted under 35 U.S.C. 154(b) by 23 days.

(21) Appl. No.: 09/959,189

(22) PCT Filed: Feb. 20, 2001

(86) PCT No.: PCT/JP01/01208

§ 371 (c)(1),
(2), (4) Date: Dec. 17, 2001

(87) PCT Pub. No.: WO01/62384

PCT Pub. Date: Aug. 30, 2001

(65) Prior Publication Data

US 2003/0006138 A1 Jan. 9, 2003

(30) Foreign Application Priority Data

Feb. 25, 2000 (JP) .......................................... 2000-48606

(51) Int. Cl.$^7$ .............................................. C25B 13/00
(52) U.S. Cl. ........................ 204/296; 204/631; 204/632; 204/633; 204/634
(58) Field of Search ................................. 204/296, 631, 204/632, 633, 634; 521/27

(56) References Cited

U.S. PATENT DOCUMENTS

| 4,253,900 A | * | 3/1981 | Dege et al. .................... 521/27 |
| 4,673,454 A | * | 6/1987 | Liu et al. ....................... 521/27 |
| 4,766,161 A | * | 8/1988 | Chlanda et al. ................ 521/27 |

* cited by examiner

Primary Examiner—Bruce F. Bell
(74) Attorney, Agent, or Firm—Sherman & Shalloway

(57) ABSTRACT

A bipolar membrane which exhibits a low water dissociation voltage for an extended period of time under a high current density condition, and a high current efficiency, without developing blister. The bipolar membrane comprises a cation-exchange membrane and an anion-exchange membrane which are joined together, wherein ion-exchange resin particles having ions exchanged with ions of a metal of an atomic number 20 to 90, such as titanium, zirconium, tin, iron, ruthenium or palladium, or with complex ions of said metal are existing on the junction interface between the cation-exchange membrane and the anion-exchange membrane.

13 Claims, No Drawings

BIPOLAR MEMBRANE

TECHNICAL FIELD

The present invention relates to a bipolar membrane capable of dissociating water at a low voltage.

BACKGROUND ART

The bipolar membrane is an ion-exchange membrane having a structure in which a cation-exchange membrane and an anion-exchange membrane are stuck together to dissociate the water into protons and hydroxyl ions. There have been proposed a variety of methods for their preparation.

For example, there have been proposed:

a method of sticking a cation-exchange membrane and an anion-exchange membrane together using a mixture of polyethyleneimine and epichlorohydrin, and adhering them together by curing (Japanese Examined Patent Publication (Kokoku) No. 3962/1957;

a method of adhering a cation-exchange membrane and an anion-exchange membrane together using an ion-exchange adhesive (Japanese Examined Patent Publication (Kokoku) No. 3961/1959);

a method of press-adhering a cation-exchange membrane and an anion-exchange membrane together by applying thereto a fine powdery ion-exchange resin or a paste-like mixture of an anion-exchange or cation-exchange resin and a thermoplastic substance (Japanese Examined Patent Publication (Kokoku) No. 14531/1960);

a method of applying a paste-like substance of a vinyl pyridine and an epoxy compound onto the surface of a cation-exchange membrane, followed by the irradiation with radioactive rays (Japanese Examined Patent Publication (Kokoku) No. 16633/1963);

a method of adhering a sulfonic acid-type high-molecular electrolyte and allylamines onto the surface of the anion-exchange membrane, followed by crosslinking by the irradiation with ionizing radioactive rays (Japanese Examined Patent Publication (Kokoku) No. 4113/1976);

a method of depositing a mixture of a dispersion of an ion-exchange resin and a matrix polymer on the surface of the ion-exchange membrane, the ion-exchange resin having an electric charge of a polarity opposite to that of the ion-exchange membrane (Japanese Unexamined Patent Publication (Kokai) No. 37190/1978, International Patent Application No. 502673/1999);

a method of forming a nonionic layer containing a chemically active moiety, and converting the active moiety into a cationic or anionic exchange group (Japanese Unexamined Patent Publication (Kokai) No. 210638/1985); and a method in which a sheet obtained by impregnation-polymerizing a polyethylene film with a styrene or a divinyl benzene is held by a stainless steel frame, one side thereof is sulfonated, the sheet is, then, removed, and the remaining portion is chloromethylated, followed by the aminnation (U.S. Pat. No. 3,562,139).

There has further been reported that a bipolar membrane having a low water dissociation voltage can be obtained by applying particular metal ions onto the surfaces of cation- and anion-exchange membranes, and by stacking the the two ion-exchange membranes one upon the other with the application of pressure (Electrochem. Acta, Vol. 31, pp. 1175–1176, 1986). However, the thus prepared bipolar membrane permits the water dissociation voltage to be raised within a relatively early time, and permits air bubbles and water bubbles to evolve between the cation- and anion-exchange membranes. Besides, the bipolar membrane itself is easily split into the cation- and anion-exchange membranes.

There has further been proposed a bipolar membrane in which an inorganic ion-exchange membranes is interposed between the anion- and cation-exchange membranes (Japanese Unexamined Patent Publication (Kokai) Nox. 172557/1994, 172558/1994, 263896/1994, 3051/1995, 11021/1995 and 11022/1995). However, this bipolar membrane has a problem of lacking stability.

There have further been proposed a bipolar membrane obtained by joining an anion-exchange member containing fine particles of a metal oxide and a cation-exchange membrane together (Japanese unexamined Patent Publication (Kokai) No. 269217/1996) and a bipolar membrane obtained by providing an intermediate layer between the anion-exchange membrane and the cation-exchange membrane, the intermediate layer comprising fine particles of a metal oxide and anion exchange groups (Japanese Unexamined Patent Publication (Kokai) No. 87853/1998). These bipolar membranes exhibit considerably favorable properties accompanied, however, by a problem in that the water dissociation voltage increases under a high current density condition.

The present invention is to provide a bipolar membrane which exhibits a low water dissociation voltage for extended periods of time under a high current density condition and a high current efficiency, maintaining good durability without developing blister or peeling of membrane.

DISCLOSURE OF THE INVENTION

In view of the above-mentioned problems, the present inventors have conducted keen study and, as a result, have proposed the invention by discovering the fact that there can be easily obtained a bipolar membrane permitting the water dissociation voltage to rise little under a high current density condition, and featuring a high current efficiency and excellent durability.

That is, the present invention provides a bipolar membrane comprising a cation-exchange membrane and an anion-exchange membrane which are joined together, wherein ion-exchange resin particles having ions of a metal of an atomic number 20 to 90 or having complex ions of said metal are existing on the junction interface between the cation-exchange membrane and the anion-exchange membrane.

The invention further provides a bipolar membrane comprising a cation-exchange membrane and an anion-exchange membrane which are joined together, wherein ion-exchange groups having ions of a metal of an element No. 20 to 90 or having complex ions of said metal are existing on at least one surface facing the junction interface of the cation-exchange membrane and the anion-exchange membrane, and ion-exchange resin particles having ions of a metal of an element No. 20 to 90 or having complex ions of said metal are existing on the junction interface between the cation-exchange membrane and the anion-exchange membrane.

The bipolar membrane according to the invention is obtained by joining the cation-exchange membrane and the anion-exchange membrane together. There is no particular limitation on the cation-exchange membrane, and any known cation-exchange membrane can be used. For example, there can be used a membrane obtained by introducing cation exchange groups such as sulfonic acid groups or carboxylic acid groups into a styrene-divinylbenzene resin or a polysulfone resin. From the standpoint of use of the bipolar membrane, in particular, it is desired to use a cation-exchange membrane having sulfonic acid groups in which the exchange groups are dissociated even under acidic conditions. The cation-exchange membrane may be of any kind and type such as the one of the polymerization type, homogeneous type, nonhomogeneous type, or the one with or without a reinforcing member. Even the ion-exchange membrane such as the one comprising the cation-exchange membrane containing anion exchange groups to some extent can be used as the cation-exchange membrane of the present invention to a sufficient degree provided the transport number of the cations is not smaller than 90%.

Though there is no particular limitation, it is desired that the cation-exchange membrane usually has a thickness of from 10 to 400 $\mu$m and, preferably, from 30 to 200 $\mu$m. From the standpoint of voltage drop and transport number, it is desired that the ion-exchange capacity is from 0.5 to 3.0 meq/g and, more particularly, from 0.7 to 2.5 meq/g. To suppress the bipolar membrane from developing blister, further, it is desired that the surfaces of the cation-exchange membrane is finely coarsened by using a sand-paper or the like.

There is no particular limitation on the anion-exchange membrane used in the invention, and any known anion-exchange membrane can be used. For example, there can be used a membrane obtained by introducing anion exchange groups such as quaternary ammonium groups, pyridinium groups or amino groups into the styrene-divinylbenzene resin or the polysulfone resin. From the standpoint of use of the bipolar membrane, in particular, it is desired to use an anion-exchange membrane having a quaternary ammonium group in which the exchange groups are dissociated even under alkaline conditions and having resistance to alkali. The anion-exchange membrane may be of any kind and type such as the one of the polymerization type, homogeneous type, nonhomogeneous type, or the one with or without a reinforcing member. Even the ion-exchange membrane such as the one comprising the anion-exchange membrane containing cation exchange groups to some extent can be used as the cation-exchange membrane of the present invention to a sufficient degree provided the transport number of the anions is not smaller than 90%.

Though there is no particular limitation, it is desired that the anion-exchange membrane usually has a thickness of from 10 to 400 $\mu$m and, preferably, from 30 to 200 $\mu$m. From the standpoint of voltage drop and transport number, it is desired that the ion-exchange capacity is from 0.4 to 2.5 meq/g and, more particularly, from 0.6 to 2.0 meq/g. To suppress the bipolar membrane from developing blister, further, it is desired that the surfaces of the anion-exchange membrane is finely coarsened by using a sand-paper or the like.

The greatest feature of the bipolar membrane of the present invention resides in that ion-exchange resin particles having ions of a metal of an atomic number 20 to 90 or having complex ions of a metal thereof (hereinafter also simply referred to as IER particles) are existing on the junction interface between the cation-exchange membrane and the anion-exchange membrane.

The IER particles referred to in the present invention may be those of any organic ion-exchange material, and there can be used, without limitation, a cation-exchange resin, an anion-exchange resin, an amphoteric ion-exchange resin or a chelate ion-exchange resin having a chelate-forming ability and into which a functional group is introduced, provided it is not soluble in water.

As the ion-exchange resin, there can be exemplified a copolymer of styrene, acrylic acid, methacrylic acid or acrylonitrile and divinylbenzene, as well as the one using cellulose or the like as a blank resin. Namely, there can be exemplified cation-exchange resins having one or more cation exchange groups such as sulfonic acid group, carboxyl group and phenolic hydroxyl group; anion-exchange resins having one or more of amino group, substituted amino group and quaternary ammonium group; amphoteric ion-exchange resins; and chelate ion-exchange resins having a group capable of forming a chelate, such as iminodiacetic acid group.

The IER particles having a small primary particle diameter and a large specific surface area are effective. It is therefore desired that the IER particles have an average primary particle diameter of from 0.02 to 10 $\mu$m and, more preferably, from 0.05 to 5 $\mu$m. Usually, these IER particles are forming aggregated particles. From the easiness of handling, it is desired that the aggregated particles of IER particles have an average particle diameter of from 0.5 to 10 $\mu$m.

The IER particles have ions of a metal of an atomic number 20 to 90 or complex ions of said metal (hereinafter these ions are simply referred to as metal ions). Owing to the IER particles having such particular ions, it is allowed to obtain a bipolar membrane exhibiting a low water dissociation voltage for extended periods of time under high current density conditions and a high current efficiency, and having good durability without developing blister or peeling of membrane. With a metal having an atomic number smaller than 20, it is not allowed to accomplish a low water dissociation voltage and a high current efficiency under a high current density condition, which is an object of the invention. When the atomic number 90 is exceeded, on the other hand, it becomes difficult to obtain a metal, which is not practicable.

The metal ions are bonded to the IER particles due to the normal exchange of ions or due to the exchange of ions based upon a chelate bond.

In the present invention, any metal can be used without limitation provided its atomic number is from 20 to 90. Particularly, there can be used metals of the Group IV or the Group VIII of periodic table. Preferred examples of the metal that can be used in the invention include iron (II, III), titanium (IV), tin (II, IV), zirconium (IV), nickel (II), palladium (III) and ruthenium (III).

The IER particles usually exists by forming a layer thereof on the junction interface between the cation-exchange membrane and the anion-exchange membrane. The layer may not have a constant thickness. It is desired that the layer of IER particles has an average thickness of, generally, from 0.02 to 100 $\mu$m from the standpoint of lowering the water dissociation voltage and maintaining the adhesion strength between the cation-exchange membrane and the anion-exchange membrane. If the water dissociation voltage and the peeling are taken into consideration, it is more desired that the layer of the IER particles has an average thickness of from 0.05 to 50 $\mu$m.

The IER particles may be made present maintaining a constant thickness on the junction interface between the cation-exchange membrane and the anion-exchange membrane. It is, however, desired to finely coarsen the surfaces on one side of the cation-exchange membrane and on one side of the anion-exchange membrane so that more IER particles are made present in the gaps formed by dents when they are joined together.

In the present invention, it is desired that the ratio of the area of the IER particle layer to the whole area of the junction interface of the cation-exchange membrane and the anion-exchange membrane, is from 1 to 99% and, more preferably, from 2 to 98% in order to suppress the rise of the water dissociation voltage and to maintain the adhesion strength between the cation-exchange membrane and the anion-exchange membrane. The ratio of the area of the IER particle layer to the whole junction interface of the cation-exchange membrane and the anion-exchange membrane, can be expressed as the ratio of the junction interface and the area of the IER particle layer projected onto a plane which is in parallel with the surface of the membrane.

Though there is no particular limitation, it is desired that the IER particles have an ion exchange capacity of, generally, from 0.5 to 5.0 meq/g and, more desirably, from 1.0 to 3.0 meq/g. It is desired that the metal ions are exchanged in a range of from 0.1 to 100% and, preferably, from 0.2 to 95%, so that the effect of the invention is exhibited distinctly.

The invention further provides a bipolar membrane in which ion-exchange resin particles having metal ions are made present on the junction interface of the cation-exchange membrane and the anion-exchange membrane, and ion exchange groups having metal ions are made present on at least one surface that faces the junction interface of the cation-exchange membrane and the anion-exchange membrane.

The description related to metal ions possessed by the IER particles can just be applied to the metal ions of the ion exchange groups made present on at least one surface facing the junction interface of the cation-exchange membrane and the anion-exchange membrane.

A known ion-exchange method can be employed for obtaining the anion- and cation-exchange membranes having the above-mentioned metal ions, by immersing general anion- and cation-exchange membranes in a solution of a salt of a metal of an atomic number 20 to 90 or in a solution of a complex of said metal, or by applying or spraying a solution of the above metal salt or a solution of the metal complex thereof onto the anion- and cation-exchange membranes. The metal ions in the anion- and cation-exchange membranes need not be homogeneously distributed in the direction of thickness of the membrane but may exist on the surface on where will be adhered at least the ion-exchange membrane of the opposite side. Further, the ratio of metal ions to be exchanged is usually from 0.001 to 100% and, particularly, from 0.01 to 50% of the whole ion exchange capacity.

The bipolar membrane of the invention can be prepared by any method but is generally prepared by the methods described below.

(1) A method in which a layer of IER particles is made present on one surface of the cation- (or anion-) exchange membrane, and a solution obtained by dissolving, in a solvent, a high-molecular material having anion (cation) exchange groups or a solution of a precursor of the high-molecular material, is spread, applied or sprayed thereon, thereby to form an anion- (or cation-) exchange membrane.

(2) A method in which a layer of IER particles is made present on one surface of a cation- (or anion-) exchange membrane, and an anion- (or cation-) exchange membrane is laminated thereon by thermal adhesion with pressure or by adhesion.

Described below is a preferred method of preparing the bipolar membrane of the present invention. Namely, concretely described below is a method in which ion exchange groups on the surface of the cation-exchange membrane are exchanged with metal ions followed by drying, IER particles exchanged with metal ions are made present on one surface of the cation-exchange membrane and are pushed so as to form a layer of the IER particles on the surface of the cation-exchange membrane, and a solution of a high-molecular material having anion exchange groups or a solution of a precursor of the high-molecular material is spread thereon and is solidified to form a layer of an anion-exchange membrane.

First, the cation-exchange membrane is preferably the one obtained by sulfonating the styrene-divinylbenzene resin or the polysulfone resin. The cation-exchange membrane is immersed in a solution of a salt of a metal of an atomic number 20 to 90, and the ion exchange groups on the surface are exchanged with metal ions of an atomic number 20 to 90 to obtain a cation-exchange membrane. The cation-exchange membrane is washed with water and is then dried to improve the adhering strength between the cation-exchange membrane and the anion-exchange membrane. It is further desired that the surface of the cation-exchange membrane of the side on where the IER particle layer is to be formed is coarsened by using a sand-paper or by the sand blast from the standpoint of increasing the adhering strength to the anion-exchange membrane. The degree of coarsening may be such that dents have depths of from 0.1 to 60 $\mu$m. It is further desired that the degree of coarsening is such that the ratio of the areas of the dents (portions which are not the surfaces of the membrane) formed by the coarsening projected onto a plane in parallel with the surface of the membrane to the whole area of the membrane, is from 1 to 99%.

The IER particles can be made present on the surface of the cation-exchange membrane by:

(1) a method of immersing the cation-exchange membrane in a suspension of IER particles;

(2) a method of adhering the IER particles onto the surface of the cation-exchange membrane by application, spraying, screen-printing or heat transfer; or (3) a method of making the IER particles present on one surface of the cation-exchange membrane, and pressing the IER particles to form a layer of IER particles on the surface of the cation-exchange membrane.

Among them, the method (3) is particularly preferred. According to this method, the step of after-treatment is smoothly carried out since the cation-exchange membrane does not expand or contract. Besides, though the reason has not yet been clarified, the bipolar membrane that is obtained exhibits excellent properties.

Concretely speaking, the IER particles are made present by directly spraying IER particles on the cation-exchange membrane that has been coarsened, and are pressed by fingers or by being pushed by squeezing so as to partly bury the IER particles in the surface of the cation-exchange membrane and, thereby, to form a layer of IER particles. The pressing pressure is desirably from 1 to 1000 kPa and, more desirably, from 5 to 100 kPa. When the pressure is too small, the adhesion is not sufficient between the IER particles and the cation-exchange membrane. When the pressure is too large, it becomes difficult to press them. It is here desired that the area of the membrane occupied by the layer of IER particles is from 1 to 99% and the thickness of the layer is from 0.02 to 100 $\mu$m.

Then, the anion-exchange membrane is formed thereon. Described below are the high-molecular weight materials having anion exchange groups formed on the surface of the cation-exchange membrane.

(1) It is desired that the high-molecular weight material has anion exchange groups in which the chief ion exchange groups are strongly basic having resistance against alkali. As such anion exchange groups, there can be exemplified a quaternary base. Use of a high-molecular weight material having the quaternary base as a chief ion exchange group is desirable from the standpoint of maintaining the water dissociation efficiency high. As the quaternary base, there can be exemplified a pyridinium group and a quaternary ammonium group. Here, since a high-molecular weight material having an ion exchange group exhibits excellent resistance against alkali, it is desired to use the quaternary ammonium group.

(2) It is desired that the high-molecular weight material having anion exchange groups for forming a membrane or a precursor of the high-molecular weight material is soluble in a solvent so as to be intimately adhered onto the rugged cation-exchange membrane on which the surface is formed the IER particle layer. The anion-exchange membrane is formed as the solvent is removed or as the chemical reaction proceeds. The anion-exchange membrane formed at this moment is adhered to the cation-exchange membrane maintaining a suitable degree of strength so that the bipolar membrane will not split into anion- and cation-exchange membranes during the use.

(3) It is desired that the high-molecular weight material has a suitable degree of flexibility. This is important from such a standpoint that the bipolar membrane is not split during the handling and does not lose performance.

(4) The high-molecular weight material shall not dissolve in water. This is because, after the bipolar membrane is obtained by once forming a membrane on the cation-exchange membrane, the high-molecular weight material shall not dissolve during the use. There are roughly two methods of forming an anion-exchange membrane by spreading a solution of a high-molecular weight material having cation exchange groups or of a precursor of the high-molecular weight material dissolved in a solvent, on the surface of the cation-exchange membrane on which the IER particles are present. One method is to form a membrane by using a linear polymer, and another method is to form a membrane of a crosslinked material.

According to the method which uses the linear polymer, an anion-exchange linear polymer is dissolved in a solvent as a high-molecular weight material having anion exchange groups, and the solution is spread on the cation-exchange membrane and is dried to form the anion-exchange membrane.

As the anion-exchange linear polymer, there can be exemplified:

a. A copolymer of a trialkylvinylbenzylammonium salt and a vinyl compound (e.g., styrene, vinyltoluene, acrylonitrile, etc.) insoluble in water;

b. A linear aminated polymer such as a quaternary ammoniated polysulfone formed by chloromethylating a polymer such as polysulfone, polyphenylene oxide or polyether ether ketone followed by imparting thereto a quaternary ammonium group with a trialkylamine; and c. A blend of a polysulfone and a polytrialkylvinylbenzylammonium salt.

It is desired that the exchange capacities of these anion-exchange linear polymers are from 0.4 to 2.5 meq/g and, particularly, from 0.6 to 2.0 meq/g from the standpoint of avoiding a drop in the current efficiency of water dissociation due to dissolution or swelling in water and avoiding an increase in the water dissociation voltage due to an increase in the electric resistance.

The linear polymer is dissolved in an organic solvent such as ethylene dichloride, chloroform, tetrahydrofuran, dimethylformamide, N-methylpyrrolidone or methyl alcohol (or, as required, in a mixed solvent thereof). Then, the solution thereof is spread on the cation-exchange membrane and is dried to form an anion-exchange membrane.

It is desired that the thickness of the membrane is from 10 to 400 $\mu$m and, more particularly, from 30 to 200 $\mu$m in order to prevent an increase in the water dissociation voltage and a decrease in the current efficiency.

According to the method of forming a membrane of a crosslinked material, in general, a precursor of a high-molecular weight material having anion exchange groups is dissolved in an organic solvent which is, then, spread on the cation-exchange membrane, and is dried and is crosslinked to form an anion-exchange membrane. As required, further, anion exchange groups may be introduced into the precursor that is used.

As the precursor of the high-molecular material having anion exchange groups, there can be exemplified a compound having a functional group that can be transformed into an anion exchange group and two or more functional groups that participate in the crosslinking, and a compound having two or more functional groups that undergo the crosslinking and the quaternary ammoniation simultaneously during the crosslinking reaction.

When there is used the compound having a functional group that can be transformed into an anion exchange group and having two or more functional groups that take part in the crosslinking, the group that can be transformed into the anion exchange group may be transformed into the anion exchange group after the crosslinking.

Here, if there is selected, as the precursor, a compound having two or more functional groups that undergo the crosslinking and the quaternary ammoniation simultaneously during the crosslinking reaction, then, it is allowed to efficiently produce the anion-exchange membrane having a quaternary ammonium group, which is desirable. Described below are combinations of compounds that can be used for the simultaneous reactions of crosslinking and quaternary ammoniation:

A: A compound (inclusive of a polymer) having two or more tertiary amino groups and a compound (inclusive of a polymer) having two or more epoxy groups;

B: A compound (inclusive of a polymer) having two or more tertiary amino groups and a compound (inclusive of a polymer) having two or more halomethyl groups.

As the compound (inclusive of the polymer) having two or more tertiary amino groups, there can be exemplified a polydialkylvinylbenzylamine, polydialkylaminoethylstyrene, polydimethylarylamine, N,N,N',N'-tetramethyl-1,6-hexamethylenediamine, and N,N,N',N'-tetramethyl-1,3-trimethylenediamine.

As the compound (inclusive of the polymer) having two or more epoxy groups, there can be exemplified bisphenol A diglycidyl ether, resorcin diglycidyl ether, glycerin triglycidyl ether, novolak polyglycidyl ether, vinylcyclohexene dioxide and dicyclopentadiene dioxide.

As the compound (inclusive of the polymer) having two or more halomethyl groups, there can be exemplified polychloromethylstyrene, chloromethylated polysulfone, chloromethylated polyphenylene oxide and chloromethylated polyether ether ketone.

To simultaneously conduct the crosslinking reaction and the quaternary ammoniation reaction, a combination of the compounds should be suitably selected out of these compounds. The selected compounds are dissolved in an organic solvent such as ethylene dichloride, chloroform, tetrahydrofurane, dimethylformamide or methyl alcohol (or as required, in a mixed solvent thereof). The solution is, then, spread on the cation-exchange membrane on which the IER particles are made present, and is crosslinked and dried to form a crosslined anion-exchange membrane.

From the standpoint of preventing a rise in the water dissociation voltage caused by an increase in the electric resistance, it is desired that the exchange capacity of the crosslinked anion-exchange membrane is from 0.4 to 2.5 meq/g and, particularly, from 0.6 to 2.0 meq/g. The membrane thickness is desirably from 10 to 400 µm and, particularly, from 30 to 200 µm.

A membrane of the crosslinked material can be formed by the following method in addition to the above-mentioned method. Namely, an organic solvent solution containing a chloromethylated linear polymer such as chloromethylated polysulfone, polychloromethylstyrene, chloromethylated polyphenylene oxide, or chloromethylated polyether ether ketone, which is a precursor of a high-molecular material having anion exchange groups and, as required, further containing an inert linear polymer which does not react with an amino compound, such as polysulfone, polystyrene or polyacrylonitrile;

is spread on a cation-exchange membrane on which an IER particle layer is present, and the solvent is removed therefrom to form a membrane which is, then, reacted with a tertiary amine such as trialkylamine, dialkylamine or N,N,N',N'-tetramethyl-1,6-hexamethylenediamine to conduct the crosslinking among the linear polymers and to introduce quaternary ammonium groups, thereby to prepare an anion-exchange membrane.

These methods are desirable since the anion-exchange membrane is formed on the surface of the cation-exchange membrane being intimately adhered thereto to a sufficient degree.

It is desired that the cation-exchange membrane on which the IER particle layer is present has been coarsened in advance. In this case, the high-molecular material having anion exchange groups dissolved in a solvent having fluidity or the solution of the precursor of said high-molecular material, partly flows onto the IER particles along the ruggedness and partly flows onto the cation-exchange membrane. The portion on where the solution of the high-molecular material having anion exchange groups or of the precursor of the high-molecular material has flown onto the cation-exchange membrane, is intimately adhered to the cation-exchange membrane, contributing to increasing the strength of adhesion between the anion-exchange membrane and the cation-exchange membrane and to enhancing the durability of the bipolar membrane.

By replacing the cation-exchange membrane by the anion-exchange membrane, and by replacing the solution of the high-molecular weight material having anion exchange groups or of the precursor of the high-molecular weight material by a solution of a high-molecular weight material having cation exchange groups or of a precursor of the high-molecular weight material thereof, it is allowed to make the IER particles present on the surface of the anion-exchange membrane by the same method as the one described above and, then, to obtain the bipolar membrane of the present invention by forming a layer of a cation-exchange membrane.

The action and mechanism by which the bipolar membrane of the present invention exhibits excellent performance have not yet been fully clarified, but it is considered that the IER particles between the anion- and cation-exchange membranes serve as a spacer which plays the role of preventing the formation of a salt between the polymers caused by direct contact of ion exchange groups of the anion- and cation-exchange membranes. At a place where the IER particles do not exist, the anion- and cation-exchange membranes are firmly joined together; i.e., the two membranes do not peel off easily. It is further considered that the IER particles work as a water dissociation catalyst to dissociate water with the application of a low voltage.

As described above, the present invention makes it possible to easily obtain a bipolar membrane which exhibits a low water dissociation voltage for extended periods of time and a high current efficiency under a high current density condition, without develop blister or peeling, and exhibiting good durability. Therefore, use of the bipolar membrane of the present invention makes it possible to greatly lower the electric power in dissociating the water.

EXAMPLES

The present invention will now be described by way of Examples and Comparative Examples. It should, however, be noted that the invention is in no way limited to these Examples only.

Properties of the bipolar membrane were measured by the methods described below. As the current efficiency and water dissociation voltage, a voltage drop through a bipolar membrane after 5 hours have passed was measured in a two-chamber cell. 100 Milliliters of a 1N hydrochloric acid aqueous solution was placed on the side of the cation-exchange membrane of a bipolar membrane having an effective membrane area of 10 cm$^2$, 100 ml of 1N sodium hydroxide was placed on the side of the anion-exchange membrane thereof, a platinum plate electrode on the side of hydrochloric acid was used as a negative electrode, the platinum plate electrode on the side of sodium hydroxide was used as a positive electrode, the current was supplied at a density of 10 A/dm$^2$ for 10 hours to measure the amounts of bases and salts in each of the chambers, in order to find current efficiencies ($\eta$H, $\eta$OH) of hydroxyl ions and hydrogen ions as the water dissociation efficiencies of the bipolar membrane and to find current efficiencies ($\eta$Cl, $\eta$Na) of chlorine ions and sodium ions. As for the water dissociation voltage after operated for extended periods of time, a three-chamber cell having the following constitution was used.

Anode (Pt plate)/3-mol NaOH solution/bipolar membrane/4-mole nitric acid solution/diaphragm (cation-exchange membrane, NEOSEPTA CMX, produced by Tokuyama Corp.)/2-mol HCl solution/cathode (Pt plate).

The current density was set to be 15 A/dm$^2$. The water dissociation voltage was measured by measuring a voltage drop through the bipolar membrane by using platinum wire electrodes installed with the bipolar membrane held therebetween in either the two-chamber cell or the three-chamber cell.

The ratio of the area of the IER particles projected onto a plane in parallel with the surface of the membrane, was found by making the IER particles present on the cation-exchange membrane, taking a picture thereof from the upper side, and by finding the ratio of the areas.

Example 1

A cation-exchange membrane, NEOSEPTA CM-1, (produced by Tokuyama Corp.) of which the surfaces have been coarsened in advance by using a sand-paper (CC 200 Cw) was immersed in an aqueous solution containing 2% by weight of ferrous chloride ($FeCl_2$) maintained at 25° C. for one hour, washed well with ion-exchanged water, and was air-dried at room temperature. The content of the iron ions in the cation-exchange membrane was 98% (2.2 meq/g) of the whole ion exchange capacity. Next, a porous strongly acidic cation-exchange resin was pulverized by using a pulverizer, treated with an aqueous solution containing 2000 ppm of ferrous chloride, and was separated by using a centrifuge and was dried to obtain IER particles having a primary particle diameter of 1 μm and an average particle diameter of aggregated particles at the time of handling of 5 μm. The content of iron ions in the resin was 50% (0.8 meq/g) of the whole ion exchange capacity. The IER particles were applied by fingers onto the surface of the membrane so as to be made present on the cation-exchange membrane. The ratio of the area of the IER particles projected onto the membrane surface was 80%.

A mixture solvent of methanol/chloroform (1:1, volume ratio) in which has been dissolved 15% by weight of an aminated polysulfone (polysulfone which was chloromethylated and was then treated with a trimethylamine to be imparted with quaternary ammonium groups) having a quaternary ammonium group exchange capacity of 0.92 meq/g, was applied onto the membrane and was dried by being left to stand at room temperature. The aminated polysulfone possessed a thickness of 80 μm and the IER particle layer possessed a thickness of from 1 to 10 μm.

Properties of the bipolar membrane were measured. The water dissociation voltage in the two-chamber cell was 0.9 volts, and the current efficiencies were ηH, ηOH=99.1%, ηCl=0.3% and ηNa=0.6%. The water dissociation voltage in the three-chamber cell was 1.0 volt when the current was first supplied and was 1.1 volts after three months have passed. During this period, no air bubble or water bubble quite evolved in the bipolar membrane.

Comparative Example 1

A bipolar membrane was obtained in quite the same manner as in Example 1 but without using IER particles treated with ferrous chloride. The cation-exchange membrane of the bipolar membrane possessed a thickness of 80 μm. Properties of the bipolar membrane were as described below.

The water dissociation voltage in the two-chamber cell was 0.9 volts, and the current efficiencies were ηH, ηOH=99.1%, ηCl=0.3% and ηNa=0.6%. The water dissociation voltage in the three-chamber cell was 1.0 volt when the current was first supplied but was 2.5 volts after one month has passed. During this period, no air bubble or water bubble quite evolved in the bipolar membrane.

Comparative Example 2

A bipolar membrane was prepared in the same manner as in Example 1 but using IER particles of the Na-type. Properties of the bipolar membrane were measured. The water dissociation voltage in the two-chamber cell was 1.2 volts, and the current efficiencies were ηH, ηOH=99.1%, ηCl=0.3% and ηNa=0.6%. The water dissociation voltage in the three-chamber cell was 1.3 volts when the current was first supplied and was 3.0 volts after one month has passed. During this period, no air bubble or water bubble quite evolved in the bipolar membrane.

Example 2

By using the cation-exchange membrane used in Example 1 and the IER particles which have exchanged ions with iron ions, the IER particles were applied by fingers onto the surface of the cation-exchange membrane. A solution of polydimethylvinylbenzylamine:bisphenol A diepoxy compound:chloroform=1:1:10 (weight ratio) was applied thereon, dried at room temperature for 10 hours to cure the epoxy resin and, at the same time, to form an anion-exchange member having quaternary ammonium groups. The anion-exchange membrane of this membrane possessed a thickness of 80 μm. The IER particle layer possessed a thickness of 1 to 10 μm, and the ratio of the area of the IER particles projected onto the surface of the membrane was 90%.

The bipolar membrane exhibited the following properties in the two-chamber cell. That is, the water dissociation voltage was 0.9 volts at first, and the current efficiencies were ηH, ηOH=99.5%, ηCl=0.3% and ηNa=0.2%. The water dissociation voltage in the three-chamber cell was 0.95 volts when the current was first supplied and was 0.95 volts even after three months have passed. During this period, no air bubble or water bubble quite evolved in the bipolar membrane.

Example 3

The cation-exchange membrane used in Example 1 was used. A porous strongly basic anion-exchange resin was pulverized by using a pulverizer, treated with an aqueous solution containing 2000 ppm of stannous chloride, and was separated by using a centrifuge and was dried to obtain IER particles having a primary particle diameter of 0.5 μm and an average aggregated particle diameter of 3 μm. The resin contained tin ions in an amount of 10% (0.05 meq/g) of the whole ion exchange capacity. The IER particles were applied by fingers onto the surface of the membrane so as to be made present on the cation-exchange membrane. The ratio of the area of the IER particles projected onto the membrane surface was 85%.

A mixture solvent of methanol/chloroform (1:1, volume ratio) in which has been dissolved 15% by weight of an aminated polysulfone (polysulfone which was chloromethylated and was then treated with trimethylamine to be imparted with quaternary ammonium groups) having a quaternary ammonium group exchange capacity of 0.92 meq/g, was applied onto the membrane and was dried by being left to stand at room temperature. The aminated polysulfone possessed a thickness of 80 μm and the IER particle layer possessed a thickness of from 0.5 to 5 μm.

Properties of the bipolar membrane in the two-chamber cell were measured. The water dissociation voltage was 1.2 volts, and the current efficiencies were ηH, ηOH=99.3%, ηCl=0.3% and ηNa=0.4%. The water dissociation voltage in the three-chamber cell was 1.2 volts when the current was first supplied and was 1.3 volts after three months have passed. During this period, no air bubble or water bubble quite evolved in the bipolar membrane.

Example 4

The cation-exchange membrane, CM-1, (produced by Tokuyama Co.) treated in the same manner as in Example 1 was immersed in a solution in which was suspended the IER particles used in Example 3 at a concentration of 2000 ppm. The IER particles were deposited on the coarsened surface and were dried to form a layer of IER particles.

The ratio of the projected area of the IER particles was 80%. Thereafter, an anion-exchange membrane was formed through the same procedure as that of Example 3.

The aminated polysulfone possessed a thickness of 80 µm, and the layer of the IER particles possessed a thickness of from 0.5 to 5 µm.

Properties of the bipolar membrane in the two-chamber cell were measured. The water dissociation voltage was 1.5 volts, and the current efficiencies were ηH, ηOH=99.3%, ηCl=0.3% and ηNa=0.4%. The water dissociation voltage in the three-chamber cell was 1.6 volts when the current was first supplied and was 2.0 volts after three months have passed. During this period, no air bubble or water bubble quite evolved in the bipolar membrane.

Example 5

The cation-exchange membrane, NEOSEPTA CM-1, (produced by Tokuyama Corp.) used in Example 1 was used. A chelate resin of the type of iminodiacetic acid was pulverized by using a pulverizer, treated with an aqueous solution containing 2000 ppm of stannous chloride, separated by using a centrifuge, and was dried to obtain IER particles having a primary particle diameter of 1 µm and an average aggregated particle diameter of 5 µm. The resin contained tin ions in an amount of 20% (0.5 meq/ml) of the whole ion exchange capacity. The IER particles were applied by fingers onto the surface of the membrane so as to be made present on the cation-exchange membrane. The ratio of the projected area of the IER particles 83%.

A mixture solvent of methanol/chloroform (1:5, volume ratio) in which has been dissolved 15% by weight of a partly aminated polystyrene (obtained by polymerizing a monomer of styrene and chloromethyl styrene at a ratio of 10:1 (molar ratio) in toluene at 70° C. in the presence of a benzoyl peroxide which is a polymerization initiator for 10 hours, pouring the reaction solution into methanol to obtain a copolymer thereof and, then, transforming the chloromethyl group of the copolymer with a trimethylamino into a quaternary ammonium group) having a quaternary ammonium group exchange capacity of 0.87 meq/g, was applied onto the membrane and was dried by being left to stand at room temperature. The aminated polystyrene possessed a thickness of 85 µm and the IER particle layer possessed a thickness of from 0.1 to 5 µm.

Properties of the bipolar membrane in the two-chamber cell were measured. The water dissociation voltage was 0.9 volts, and the current efficiencies were ηH, ηOH=99.2%, ηCl=0.3% and ηNa=0.5%. The water dissociation voltage in the three-chamber cell was 0.95 volts when the current was first supplied and was 0.95 volts after three months have passed. During this period, no air bubble or water bubble quite evolved in the bipolar membrane.

Example 6

A tetrahydrofuran solution containing 15% by weight of a chloromethylated polysulfone having a chlorine content of 1.1 meq/g and 10 g of an N,N,N',N'-tetramethyl-1,6-hexamethylenediamine, was applied onto a cation-exchange membrane on which has been applied the same IER particles as those obtained in Example 5, and was dried while distilling off the solvent at room temperature for 5 hours. Crosslinked quaternary ammonium groups were formed as the drying proceeded, and there were formed an anion-exchange membrane and, hence, a bipolar membrane. The thickness of the anion-exchange membrane was 90 µm and the thickness of the IER particle layer was from 0.1 to 5 µm.

Properties of the bipolar membrane were measured. The water dissociation voltage in the two-chamber cell were was 0.9 volts, and the current efficiencies were ηH, ηOH=99.4%, ηCl=0.3% and ηNa=0.3%. The water dissociation voltage in the three-chamber cell was 0.9 volts when the current was first supplied and was 0.92 volts after three months have passed. During this period, no air bubble or water bubble quite evolved in the bipolar membrane.

Examples 7 to 10

The pulverized cation-exchange resins same as that of Example 1 were treated in the aqueous solutions each containing 2000 ppm of ruthenium chloride, 1% by weight of nickel chloride, 1% by weight of palladium chloride and 1% by weight of zirconium nitrate, and were separated by using a centrifuge and were dried to obtain fine cation-exchange resin powders of the metal ion types. The powders possessed a primary particle diameter of 1 µm and an average aggregated particle diameter of 5 µm. The resins contained ruthenium, nickel, palladium and zirconium each in an amount of 50% (0.8 meq/g) of the exchange capacity.

The fine resin powders were applied by fingers onto the surfaces of the cation-exchange membranes, NEOSEPTA CM-1, that have been coarsened with a sand-paper so that the IER particles were made present on the cation-exchange membranes. The ratios of the projected areas of the IER particles were 80%.

A mixture solvent of methanol/chloroform (1:1, volume ratio) in which has been dissolved 15% by weight of an aminated polysulfone (polysulfone which was chloromethylated and was then treated with a trimethylamine to be imparted with quaternary ammonium groups) having a quaternary ammonium group exchange capacity of 0.92 meq/g, was applied onto the membranes and was dried by being left to stand at room temperature. The aminated polysulfone possessed a thickness of 80 µm and the IER particle layers possessed a thickness of from 1 to 10 µm.

Properties of the bipolar membranes were measured. The water dissociation voltages in the two-chamber cell were 0.88, 0.90, 0.95 and 0.90 volts for the IER particles exchanged with ions of ruthenium, nickel, palladium and zirconium, respectively, and the current efficiencies were ηH, ηOH=99.1%, ηCl=0.3% and ηNa=0.6%. The water dissociation voltages in the three-chamber cell were 0.90, 1.0, 1.05 and 1.0 volts for the respective IER particles when the current was first supplied and were 1.0, 1.10, 1.20 and 1.10 volts after one month has passed. During this period, no air bubble or water bubble quite evolved in the bipolar membrane.

Examples 11 to 14

Bipolar membranes were prepared by the same procedure as described above but exchanging the ions of the cation-exchange membranes used in Examples 7 to 10 with ions of ruthenium, nickel, palladium and zirconium. The rates of exchanging ions with these metal ions were all 40% of the ion exchange capacity of the cation-exchange membranes. The projected areas of the IER particles were 80% and the thicknesses of the IER particle layers were from 1 to 10 µm.

Properties of the bipolar membranes were measured. The water dissociation voltages in the two-chamber cell were 0.85, 0.88, 0.92 and 0.88 volts for ruthenium, nickel, palladium and zirconium, respectively, and the current efficiencies were ηH, ηOH=99.1%, ηCl=0.3% and ηNa=0.6%. The water dissociation voltages in the three-chamber cell were 0.90, 1.0, 1.05 and 1.0 volts for the respective IER particles when the current was first supplied and were 1.0, 1.10, 1.20 and 1.10 volts after three months have passed. During this period, no air bubble or water bubble quite evolved in the bipolar membrane.

What is claimed is:

1. A bipolar membrane comprising a cation-exchange membrane and an anion-exchange membrane which are joined together, wherein ion-exchange resin particles having ions of a metal of an atomic number 20 to 90 or having complex ions of said metal are existing on the junction interface between the cation-exchange membrane and the anion-exchange membrane.

2. A bipolar membrane according to claim 1, wherein the metal of an atomic number 20 to 90 is a metal of the Group IV or of the Group VIII of periodic table.

3. A bipolar membrane according to claim 2, wherein the metal of the Group IV or of the Group VIII of periodic table is at least one metal selected from the group consisting of iron, titanium, tin, zirconium, nickel, palladium and ruthenium.

4. A bipolar membrane according to claim 1, wherein the ion-exchange resin particles having ions of a metal of an atomic number 20 to 90 or having complex ions of said metal, are the ion-exchange resin particles having ions being exchanged with ions of the metal of an atomic number 20 to 90 or with complex ions of said metal.

5. A bipolar membrane according to claim 1, wherein the ion-exchange resin particles are forming a layer on the junction interface between the cation-exchange membrane and the anion-exchange membrane.

6. A bipolar membrane according to claim 5, wherein the layer of the ion-exchange resin particles has an average thickness of from 0.02 to 100 μm.

7. A bipolar membrane according to claim 5, wherein a ratio of the area of the layer of the ion-exchange resin particles and the area of the whole junction surface is from 1 to 99% as a ratio of the area projected onto a plane in parallel with the surface of the membrane.

8. A bipolar membrane according to claim 1, wherein the ion-exchange resin particles are the ones having ions exchanged with the ions of a metal of an atomic number 20 to 90 or with complex ions of said metal over a range of 0.1 to 100% of the whole ion exchange capacity.

9. A bipolar membrane comprising a cation-exchange membrane and an anion-exchange membrane which are joined together, wherein ion-exchange groups having ions of a metal of an atomic number 20 to 90 or having complex ions of said metal are existing on at least one surface facing the junction interface of the cation-exchange membrane and the anion-exchange membrane, and ion-exchange resin particles having ions of a metal of an atomic number 20 to 90 or having complex ions of said metal are existing on the junction interface between the cation-exchange membrane and the anion-exchange membrane.

10. A bipolar membrane according to claim 9, wherein the metal of an atomic number 20 to 90 is a metal of the Group IV or of the Group VIII of periodic table.

11. A bipolar membrane according to claim 10, wherein the metal of the Group IV or of the Group VIII of periodic table is at least one metal selected from the group consisting of iron, titanium, tin, zirconium, nickel, palladium and ruthenium.

12. A bipolar membrane according to claim 9, wherein the ion-exchange resin particles are the ones having ions exchanged with the ions of a metal of an atomic number 20 to 90 or with complex ions of said metal over a range of 0.1 to 100% of the whole ion exchange capacity.

13. A bipolar membrane according to claim 9, wherein the cation-exchange membrane and/or the anion-exchange membrane are the ones having ions exchanged with the ions of a metal of an atomic number 20 to 90 or with complex ions of said metal over a range of 0.001 to 100% of the whole ion exchange capacity.

* * * * *